UNITED STATES PATENT OFFICE.

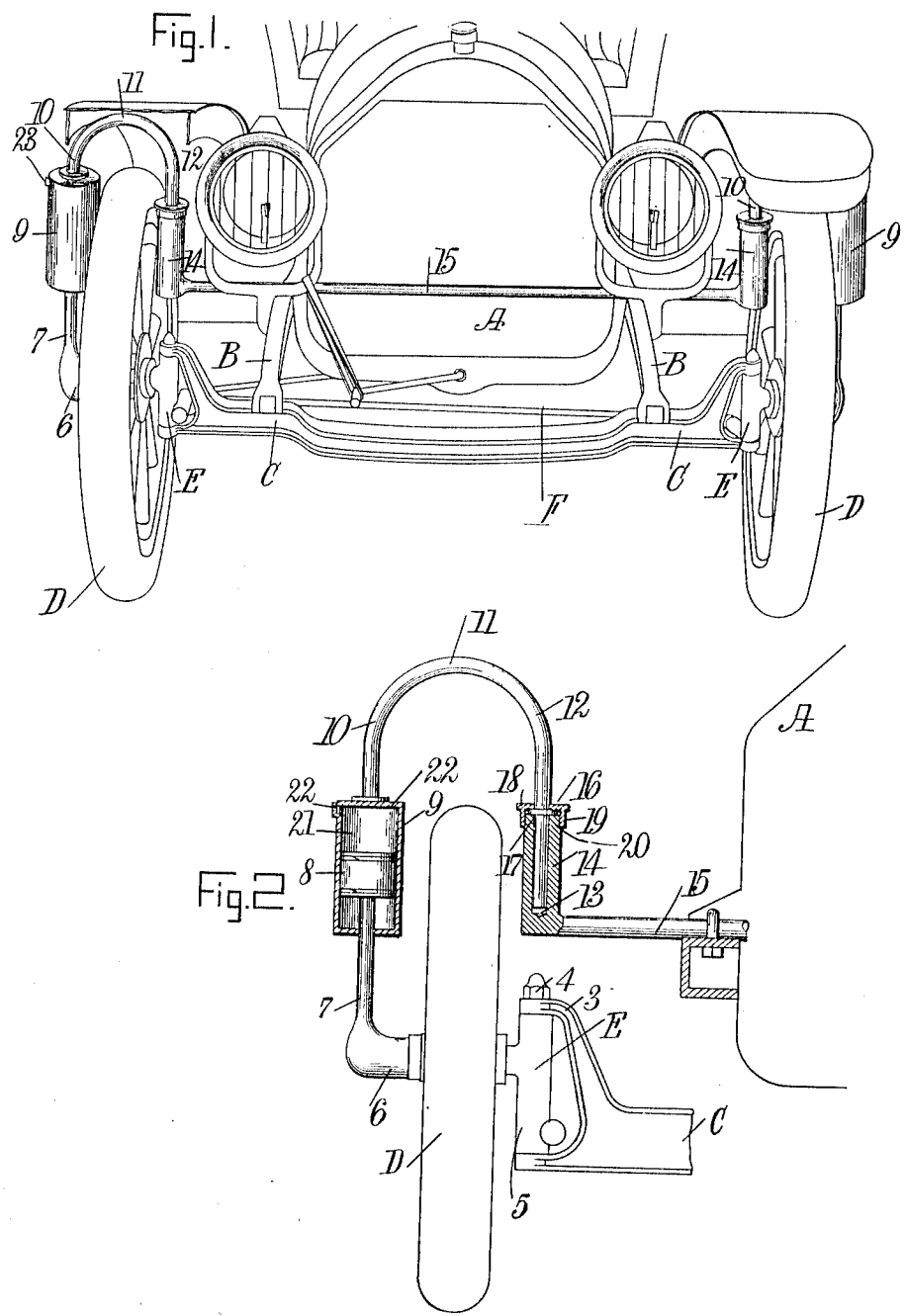

RAMÓN FEBRES CORDERO, OF RUBIO, VENEZUELA.

FRONT VEHICLE SUSPENSION.

1,073,796.  Specification of Letters Patent.  Patented Sept. 23, 1913.

Application filed July 25, 1911, Serial No. 640,473. Renewed February 14, 1913. Serial No. 748,466.

*To all whom it may concern:*

Be it known that I, RAMÓN FEBRES CORDERO, a citizen of the Republic of Venezuela, and a resident of Rubio, in the State of Tachera, Venezuela, have invented a new and Improved Front Vehicle Suspension, of which the following is a full, clear, and exact description.

My invention relates in general to a new and novel form of vehicle wheel suspension, and more specifically relates to a combined suspension and shock absorber, particularly adapted to be positioned on the front of a vehicle or in any other place where the traction wheels are mounted for steering.

An object of my invention is to provide a pneumatic cushioning suspension for the steering wheels of a vehicle, which will be effectively braced on a vehicle and will contain relatively few working parts which might get out of order.

A further object of my invention is to provide a reinforcement for the form of knuckle suspension joint now commonly used in automobile construction.

I attain the above-outlined objects by pivotally mounting to the vehicle, above the main axle, an inverted U-shaped bracket, the outer arm of which is connected to the wheel axle by means of a compressed air cylinder.

With the above and other objects in view as will more fully hereinafter appear, the present invention consists in certain novel details of construction and arrangement of parts hereinafter fully described, illustrated in the accompanying drawings and more particularly pointed out in the appended claims.

Reference is to be had to the accompanying drawings, forming a part of this specification, in which similar characters of reference indicate corresponding parts in both the figures, and in which—
Figure 1 is a front elevation of an automobile showing a preferred embodiment of my invention attached thereto, and Fig. 2 is a vertical transverse sectional view through one wheel and its attached mechanism.

As shown more particularly in Fig. 1, there is disclosed an automobile A, rigidly connected to the chassis B of which is the horizontally-disposed main axle C, to the opposite ends of which axle are attached the traction wheels D by means of the knuckle joints E, which wheels are steered by means of the steering gear F. In other words, there is disclosed here, an approved form of automobile construction, but it is of course to be understood that this disclosure shows but one place in which my improved mounting may be used, it being of general application to any similar construction.

The knuckle E is of the general yoke construction 3, carrying a pin 4, surrounding which pin is a vertically-disposed sleeve 5, integral with which sleeve and extending at right angles to the same and outwardly of the vehicle is the wheel axle 6 upon which is mounted the wheel D. At the outside of the wheel, the axle is bent upward to form a piston rod 7, at the upper end of which is a relatively long piston head 8 moving in a piston cylinder 9, which piston cylinder is rigidly attached to the outer arm 10 of an inverted U-shaped bracket 11. This bracket 11 straddles the wheel D and has its inner arm 12 rotatably mounted in the bore 13 of a relatively long socket 14 disposed above the knuckle, so that the axis of the inner arm 12 of the bracket 11, the bore 13 and the pivotal line of the knuckle, will all be in the same vertical line. The socket 14 is rigidly mounted upon the end of a transverse supporting rod 15, rigidly mounted upon the chassis B or other suitable part of the frame of the machine. In order to retain the bracket in the socket 14, there is rigidly mounted in the inner arm 12, a collar 16, which collar rests upon the upper edge 17 of the socket 14 and is held in position by means of a cap 18, which cap surrounds the arm 12 and bears upon the collar 16, said cap having an internally screw-threaded flange 19 depending therefrom, the threads of which engage with threads 20 upon the outer upper end of the socket 14.

The space 21 within the cylinder 9 and between the piston head 8 and cylinder head 22, is a reservoir of compressed air or other fluid, which will act as a pneumatic cushion to take up jolts on the traction wheel transmitted through the axle 6 to the piston head 8. This cylinder may be charged through a vent 23.

This construction described in detail for one wheel and its attachment, is duplicated upon the other wheel or wheels as may be desired.

It will be seen by this construction, that the relatively long connection between the inner arm 12 and the socket 14, and the relatively long piston head 8 in its cylinder 9, will in effect reinforce the knuckle E, which is the weakest point of the vehicle suspension now in common use. Further, it will be seen that the wheel may be steered as is common with similarly constructed wheels now in general use, but, at the same time, any vertical movement of the wheel is cushioned by the piston head 8 compressing the fluid in the space 21.

It will also be seen that this construction in effect supports the wheel by carrying the wheel axle 6 on both its inner and its outer sides, and at the same time, affords a neat substantial construction which is neither cumbersome nor unsightly, and in which there are relatively few parts that may get out of order.

While a preferred embodiment of the invention has been described, it is to be understood that many changes could be made in the above construction and many apparently widely different embodiments of this invention could be made without departing from the scope thereof.

It is intended that all matters contained herein in the above description or shown in the accompanying drawings, shall be interpreted as illustrative and not in a limiting sense.

It is also to be understood that the language used in the following claims is intended to cover the full scope of the invention and is not to be given any narrower construction than the prior art demands, and that materials, sizes and relativities of parts are non-essential, except as called for in the claims.

Having thus described my invention, I claim as new and desire to secure by Letters Patent:

1. In a vehicle having a pair of vertically extending sockets on opposite sides thereof, a pair of traction wheels, a separate wheel axle for each wheel, a main axle mounted on said vehicle and having its opposite ends pivoted to one of said wheel axles, a pair of inverted U-shaped brackets, one straddling each wheel and having an inner arm pivoted within said vertically extending socket on the vehicle and in a vertical line containing the pivotal point of its respective wheel axle with the main axle, a compressed air cylinder depending from and in line with the outer arm of each of said brackets, a piston head movable in each of said cylinders, and piston rods integrally attached to said heads and depending therefrom, said piston rods integrally connected with the outer end of each of said wheel axles.

2. In a vehicle, a pair of traction wheels, a separate wheel axle for each wheel, a main axle mounted on said vehicle and having its opposite ends pivoted to one of said wheel axles, a pair of inverted U-shaped brackets, one bracket straddling each of said wheels and disposed in the plane containing said wheel axle, a relatively long open top socket rigidly mounted on the vehicle on opposite sides of the same, disposed above and in the vertical line containing the turning point between the main and wheel axles, the inner arm of each of said brackets removably and rotatably mounted in said socket, and a connection between the outer end of each of said brackets and said wheel axle, said connection comprising a vertically - disposed closed cylinder and a relatively long piston head, said connection and socket reinforcing the connection of the wheel with the vehicle.

In testimony whereof I have signed my name to this specification in the presence of two subscribing witnesses.

RAMÓN FEBRES CORDERO.

Witnesses:
 JULIAN A. ARROYO,
 W. S. ORTON.

Copies of this patent may be obtained for five cents each, by addressing the "Commissioner of Patents, Washington, D. C."